(12) United States Patent
Dondini et al.

(10) Patent No.: US 10,891,399 B2
(45) Date of Patent: Jan. 12, 2021

(54) SYSTEM INCLUDING INTELLECTUAL PROPERTY CIRCUITS COMMUNICATING WITH A GENERAL PURPOSE INPUT/OUTPUT PAD, CORRESPONDING APPARATUS AND METHOD

(71) Applicant: STMicroelectronics S.r.l., Agrate Brianza (IT)

(72) Inventors: Mirko Dondini, Catania (IT); Gaetano Di Stefano, San Pietro Clarenza (IT); Sergio Abenda, Catania (IT)

(73) Assignee: STMicroelectronics S.R.L., Agrafe Brianza (IT)

( * ) Notice: Subject to any disclaimer, the term of this patent is extended or adjusted under 35 U.S.C. 154(b) by 193 days.

(21) Appl. No.: 15/945,177

(22) Filed: Apr. 4, 2018

(65) Prior Publication Data
US 2018/0341791 A1 Nov. 29, 2018

(30) Foreign Application Priority Data
May 26, 2017 (IT) .................. 102017000057307

(51) Int. Cl.
*G06F 21/85* (2013.01)
*G06F 15/78* (2006.01)
(Continued)

(52) U.S. Cl.
CPC .......... *G06F 21/85* (2013.01); *G06F 13/4022* (2013.01); *G06F 15/7807* (2013.01); *G06F 21/72* (2013.01); *G06F 21/74* (2013.01)

(58) Field of Classification Search
CPC .......... G06F 21/85; G06F 21/72; G06F 21/74; G06F 15/7807; G06F 13/4022; G06F 13/20
See application file for complete search history.

(56) References Cited

U.S. PATENT DOCUMENTS 6,138,240 A * 10/2000 Tran .................. G06F 21/82
726/19
8,547,135 B1 * 10/2013 Yarlagadda ............... G06F 1/26
326/38
(Continued)

FOREIGN PATENT DOCUMENTS

CN 102638594 A 8/2012

OTHER PUBLICATIONS

"Product Overview," Samsung Electronics, S3C44B0X RISC Microprocessor, XP055446456, http://datasheets.chipdb.org/Samsung/S3c44B0X, Apr. 27, 20006, 29 pages.

*Primary Examiner* — Cheng-Feng Huang
(74) *Attorney, Agent, or Firm* — Slater Matsil, LLP

(57) ABSTRACT

A system includes an intellectual property circuit; a general purpose input/output circuit coupled to the intellectual property circuit via a data path; and a switch coupled to the data path. The switch is activatable via a switch enable signal propagated on a switch enable path having a first end coupled to the intellectual property circuit and a second end coupled to the general purpose input/output circuit. The system further includes a secure link circuit coupled between the intellectual property circuit and the general purpose input/output circuit along the switch enable path. The secure link circuit is sensitive to security statuses of the intellectual property circuit and the general purpose input/output circuit, the secure link circuit being configured to admit propagation of the switch enable signal on the switch enable path in response to the intellectual property circuit and the general purpose input/output circuit having identical security statuses.

27 Claims, 8 Drawing Sheets

(51) Int. Cl.
*G06F 21/74* (2013.01)
*G06F 21/72* (2013.01)
*G06F 13/40* (2006.01)

(56) References Cited

U.S. PATENT DOCUMENTS

| | | | | |
|---|---|---|---|---|
| 10,616,333 | B2* | 4/2020 | Dondini | H04L 67/1097 |
| 2003/0025519 | A1* | 2/2003 | Hsieh | G01R 31/3187 |
| | | | | 324/754.07 |
| 2004/0153982 | A1* | 8/2004 | Zhang | G06F 30/30 |
| | | | | 716/115 |
| 2009/0304181 | A1* | 12/2009 | Fischer | H01L 23/57 |
| | | | | 380/46 |
| 2014/0035746 | A1* | 2/2014 | Leyden | H02J 7/0021 |
| | | | | 340/568.1 |
| 2014/0137231 | A1* | 5/2014 | Sastry | G06F 13/385 |
| | | | | 726/16 |
| 2014/0380403 | A1* | 12/2014 | Pearson | G06F 21/57 |
| | | | | 726/1 |
| 2015/0296018 | A1* | 10/2015 | Dondini | H04L 45/72 |
| | | | | 709/213 |
| 2016/0034694 | A1* | 2/2016 | Rajendran | G09C 1/00 |
| | | | | 713/190 |
| 2016/0180114 | A1* | 6/2016 | Sastry | G06F 21/85 |
| | | | | 713/189 |
| 2016/0329900 | A1* | 11/2016 | Thiagarajan | H03K 19/17712 |
| 2018/0173899 | A1* | 6/2018 | Chandra | G06F 21/75 |

* cited by examiner

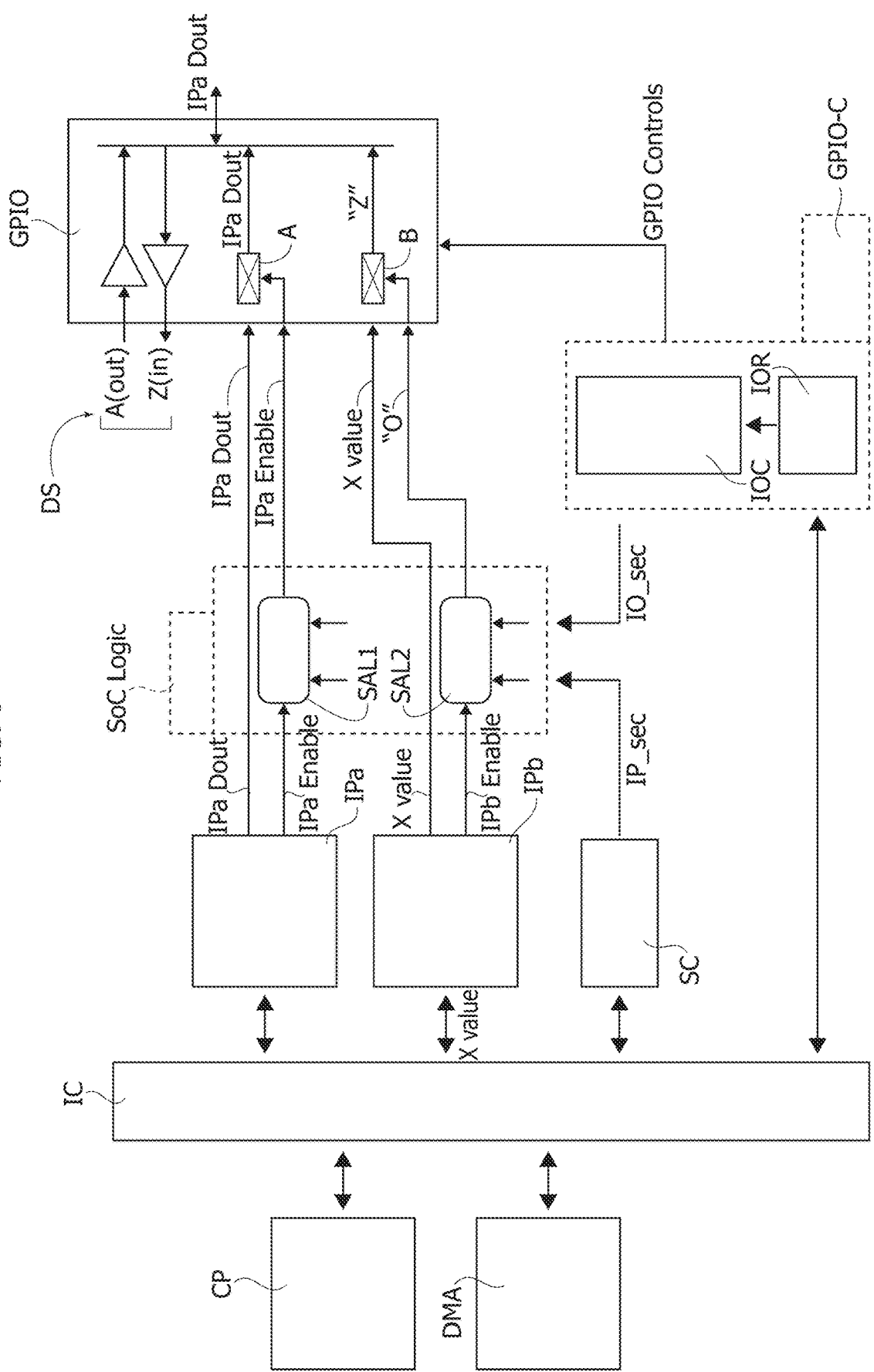

SYSTEM INCLUDING INTELLECTUAL PROPERTY CIRCUITS COMMUNICATING WITH A GENERAL PURPOSE INPUT/OUTPUT PAD, CORRESPONDING APPARATUS AND METHOD

CROSS-REFERENCE TO RELATED APPLICATIONS

This application claims priority to Italian Patent Application No. 102017000057307, filed on May 26, 2017, which application is hereby incorporated herein by reference.

TECHNICAL FIELD

The description relates generally to systems including a plurality of intellectual property circuits (IP's) communicating with a general purpose input/output (GPIO) pad. For the sake of brevity, such a system will be hereinafter referred to as an IP-GPIO system.

BACKGROUND

Various emerging application scenarios, such as the Internet of Things (IoT) or the automotive area, have fostered increased interest for protection of data and code from potential software attacks for security and safety reasons.

A certain degree of protection is thus desirable also for general purpose products such as consumer products (e.g. home appliances such as TV screens, refrigerators, washing machines and so on) employing micro-controllers in order to ensure proper handling of these aspects. An increased attention is thus paid to interconnections between analog Intellectual Properties (IP's) and General Purpose Input/Output pads (GPIO's) in Systems-on-Chip (SoC's) and to the information exchanged on the associated hardware links.

In order to meet different application requirements, various products for the general-purpose market, e.g. microcontrollers, may include a hardware capability to connect a plurality of analog IP's to a same GPIO, thus permitting access to a same external destination from different internal sources. To that effect, access to a shared path within a GPIO may be gained through dedicated analog switches, embedded in the GPIO, one for each analog IP connected thereto. These switches may be controlled by means of digital enable signals from digital logics associated with the analog IP's, thereby allowing or denying transmission of analog signals pertaining to a certain IP to an output pad handled by the GPIO.

Electrical contention avoidance among these multiple possible connections may be achieved by software running on an embedded core. This may configure a product according to a certain selected application, enabling appropriate connections between one or more analog IP's and a certain GPIO.

Such an approach may provide flexibility as given: from the viewpoint of an analog IP, by the possibility of being connected to different GPIO's, and from the viewpoint of a GPIO, by the possibility of being accessed by different analog IP's.

The capability for a SoC to support multiple package and pin count options (adapted to cover applications spanning from low-cost, low-power devices to high-performance, full-connectivity requirements) may represent an asset e.g. in allowing software-controlled system re-configuration. European Patent Application 17305250.7 is exemplary of prior advances in the area considered herein.

Despite the extensive activity in that area, further improved solutions are desirable to provide a reasonable level of security without giving rise to overly complex (and correspondingly expensive) arrangements.

SUMMARY

One or more embodiments may provide a system, including an intellectual property circuit; a general purpose input/output circuit coupled to the intellectual property circuit via a data path; a switch coupled to the data path, the switch controlling signal propagation on the data path, the switch activatable via a switch enable signal propagated on a switch enable path, the switch enable path having a first end coupled to the intellectual property circuit and a second end coupled to the general purpose input/output circuit; and a secure link circuit coupled between the intellectual property circuit and the general purpose input/output circuit along the switch enable path, the secure link circuit being sensitive to a security status of the intellectual property circuit and a security status of the general purpose input/output circuit, the secure link circuit being configured to admit propagation of the switch enable signal on the switch enable path in response to the intellectual property circuit and the general purpose input/output circuit having identical security statuses.

One or more embodiments may relate to a corresponding apparatus (e.g. a consumer product such as a microcontroller-based consumer product such as a home appliance) and a corresponding method.

One or more embodiments may be applied to System-on-Chip (SoC) arrangements.

BRIEF DESCRIPTION OF THE DRAWINGS

One or more embodiments will now be described, by way of example only, with reference to the annexed figures, wherein:

FIGS. 8 and 9 are exemplary of the possible behavior of one or more embodiments when subject to attacks.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 1:
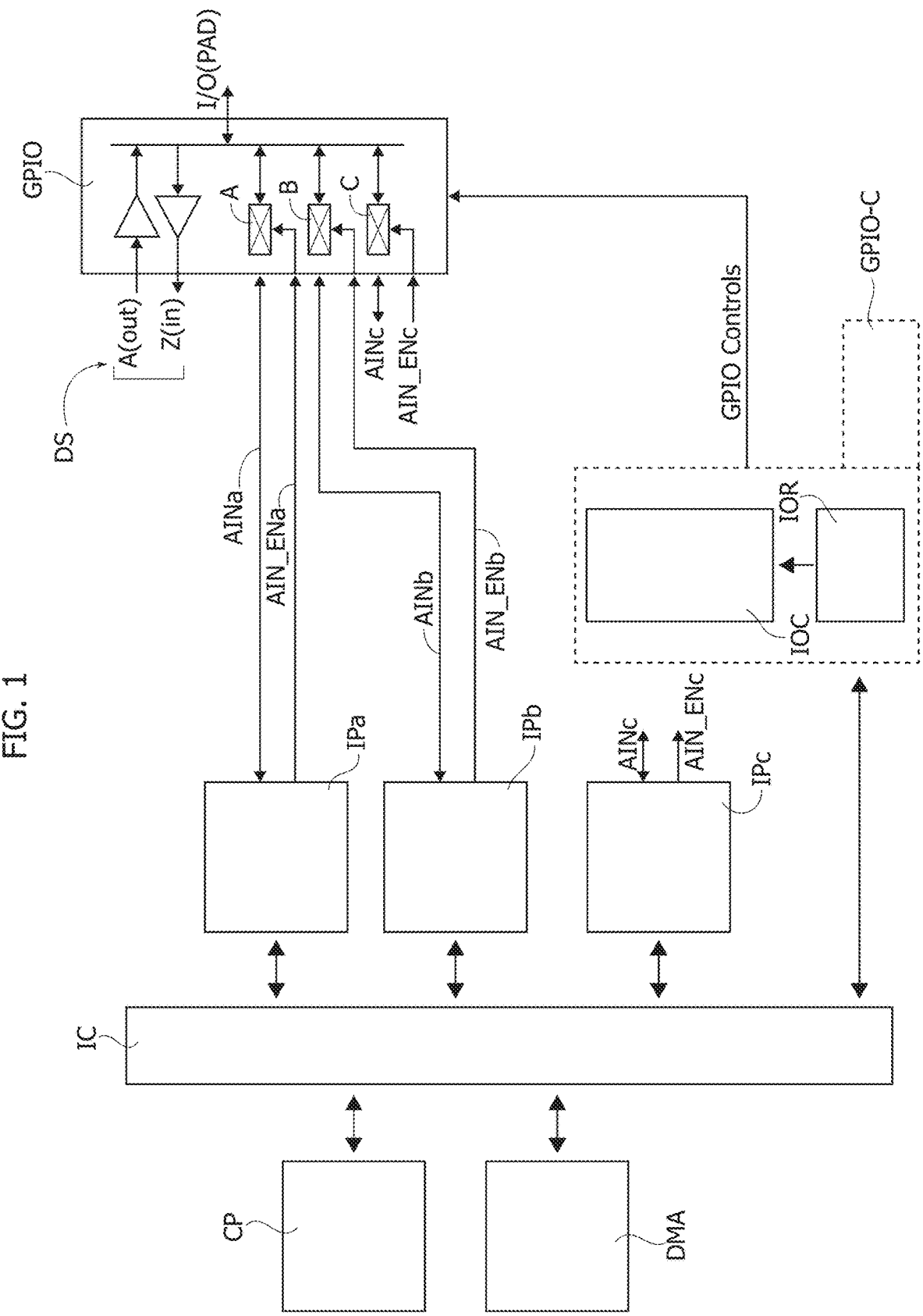
FIG. 1 is a block diagram exemplary of a system including plural analog IP's and a single shared GPIO.

The block diagram of FIG. 1 is exemplary of a System-on-Chip (SoC) arrangement including e.g. three analog IP's, namely IPa, IPb, IPc coupled to a same input/output pad (I/O PAD) via a General-Purpose Input/Output (GPIO) block.

In an arrangement as exemplified in FIG. 1, the IP-to-GPIO data path includes three analog switches A, B, C having one terminal shorted to the I/O pad (I/O PAD) and the other connected to the input (or output) of a corresponding analog IP as exemplified by the connections designated AINa, AINb, AINc.

In an arrangement as exemplified in FIG. 1, each analog IP also has a digital output signal which is coupled to a corresponding enable signal of the homologous GPIO analog switch in order to enable or disable IP-to-pad communication. Such an enable signal (e.g. AIN_ENa, AIN_ENb, AIN_ENc) can be managed by software through the analog IP digital interface to the system in order to selectively activate the IP's according to an application currently running.

A programmable digital controller (GPIO-C) can be provided to manage the software configuration of a certain number of GPIO's, by selecting different ways of operation which can be supported by a GPIO, e.g. digital connections or analog connections with a pad (it will be appreciated that reference to such connections is merely exemplary of the functions adapted to be controlled by the controller GPIO-C).

For instance, a GPIO controller GPIO-C can handle different types of GPIO's, with or without analog or digital interfaces, possibly via a certain number of analog switches.

In a context as considered herein, the GPIO controller GPIO-C may facilitate configuring the GPIO in an analog mode thus allowing analog IP's to access the pad indicated I/O(PAD).

From the functional viewpoint, via an interconnect channel IC, application software running on the SoC core processor CP can configure a certain analog IP (for instance IPa) in order to establish a data communication path to the external world via the I/O pad through data and control signals (AINa, AIN_ENa) while the other analog IP's (for instance IPb, IPc) sharing the same pad are disabled. Also, the core processor CP can be programmed (e.g. via software) in order to act also on the GPIO Controller GPIO-C through its internal registers IOR to generate digital control signals (GPIO Controls) to the GPIO component. These signals may enable the analog circuit section thereof and permit communication between e.g. IPa and the I/O pad through the GPIO without contention with the digital section thereof (designated DS in the figures).

In the diagram of FIG. 1 DMA denotes a direct memory access block adapted to cooperate with the interconnect channel IC as conventionally included in SoC's.

A way of addressing security issues such as the extension of security coverage to an analog IP-to-GPIO data path may involve rendering secure the start and end points of the communication channel, namely IP's and GPIO's, respectively.

That result can be facilitated by using hardware components already available in a SoC and/or components implemented for that specific purpose.

These components may include, e.g., a security/protection digital controller, programmable by secure application software, which may qualify which IP's in a SoC are considered secure and which are not considered secure. These components may, additionally or alternatively, include, for example, a certain number of GPIO digital controllers (for instance the GPIO Controller GPIO-C exemplified in FIG. 1). These are conventionally available in a SoC and can be dedicated to managing a group of GPIO's by being programmed by means of secure application software e.g. via their embedded registers (see IOR in the diagram of FIG. 1) in order to configure the GPIO's and distinguish between secure and non-secure GPIO's.

Such an approach can operate satisfactorily with a single, point-to-point, dedicated analog connection between an IP and a GPIO. It was, however, observed that such an approach may not ensure an adequate level of security in the case of SoC architectures involving multiple analog IP connections through a same pad. This may be the case, e.g. of general-purpose microcontrollers where providing such flexibility involves GPIO's embedding multiple analog switches.

More to the point, it was observed that such an approach exhibits various weaknesses to various types of attacks as exemplified in FIGS. 2 to 5, where (unless otherwise indicated) like reference symbols indicate like components/elements/signals as discussed in connection with FIG. 1.

Figure 2:
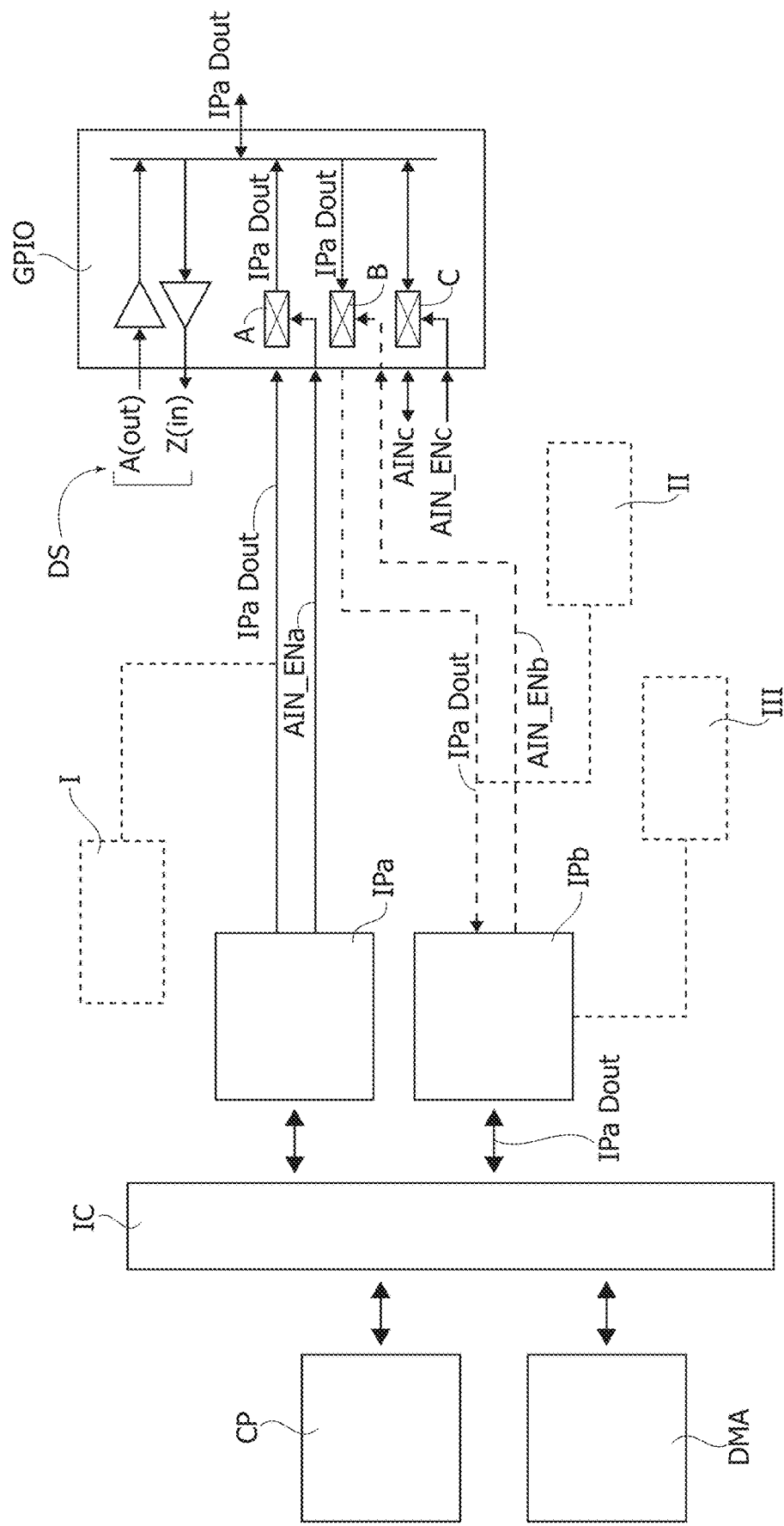
FIGS. 2 to 5 are exemplary of various types of attacks which may be brought against a system as exemplified in FIG. 1.

For instance, the diagram of FIG. 2 is exemplary of a situation where a secure analog IP (e.g. IPa) sends its data IPa Dout to a corresponding GPIO that has been configured by the GPIO Controller GPIO-C to accept analog communications (versus digital ones) as exemplified at I.

Under these circumstances, IPa also controls the enable signal (AIN_ENa) that drives the analog switch A within the GPIO in order to establish an analog connection while allowing a dynamic control of the output pad according to data transfer.

In such a situation, a software attacker could take control of a non-secure analog IP (for instance IPb) that shares the same GPIO as exemplified at II by programming it in order to activate the corresponding analog switch B in the GPIO through the corresponding enable signal AIN_ENb.

In that way malicious software may capture secure data by reading them through the digital interface of IPb: the secure data transmitted by IPa have been routed through a non-secure connection, through the analog switch B dedicated to IPb and may be read by non-secure software as exemplified by III in FIG. 2.

Figure 3:
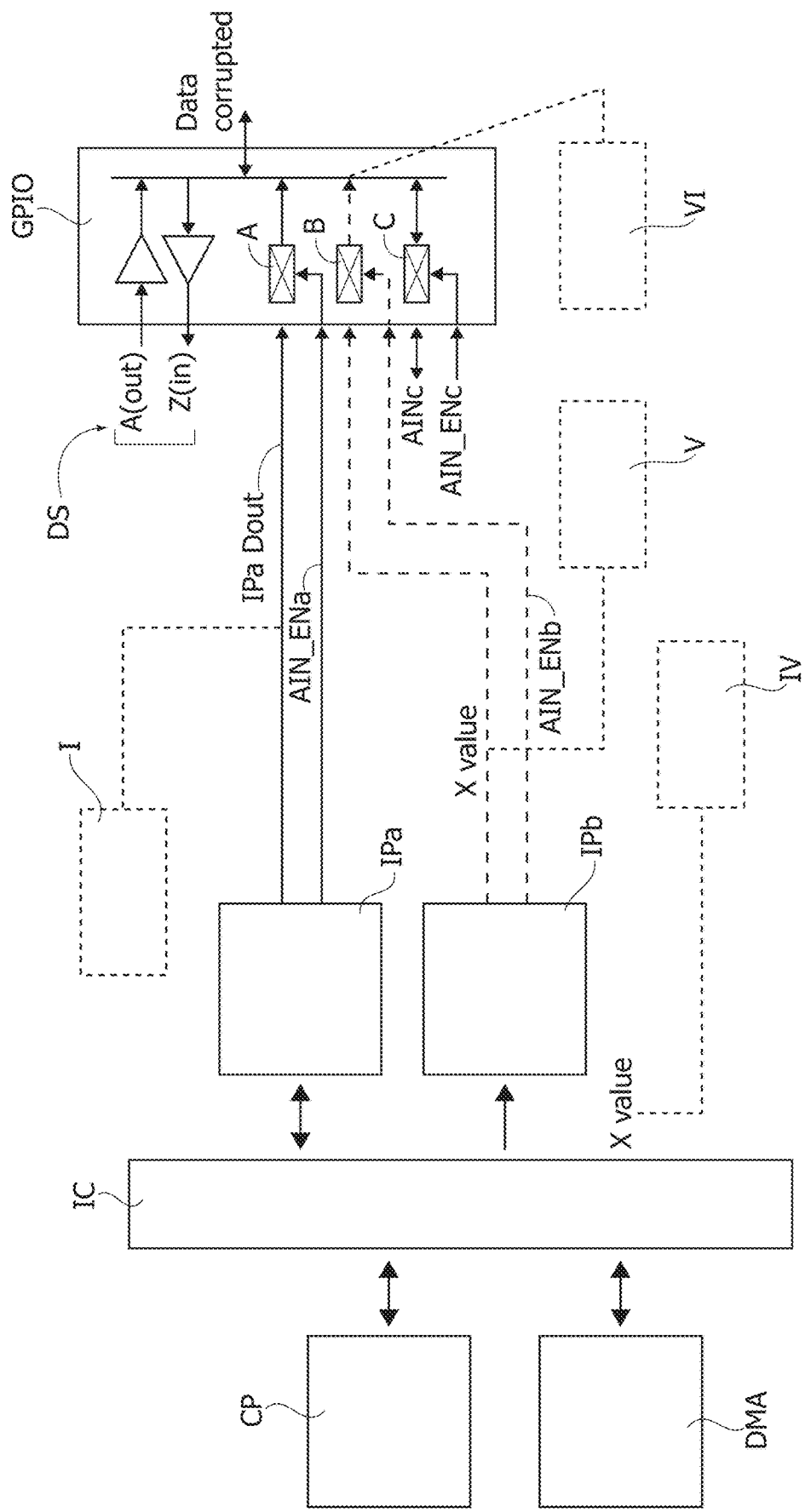

The diagram of FIG. 3 is exemplary of a complementary case where e.g. IPa again transmits analog data over a secure connection as exemplified by I towards the assigned GPIO. In the exemplary case of FIG. 3 the software attacker may force a corrupting value X through the digital interface of IPb as indicated at IV. This corrupting value may be converted by IPb to an analog value with the corresponding analog switch B embedded in the GPIO enabled through the signal AIN_ENb as exemplified at V. This will create an electrical contention at the GPIO output as exemplified at VI due to multiple drivers forcing data over a same net.

As a result, secure data from IPa may be corrupted with security of connection being lost.

Figure 4:
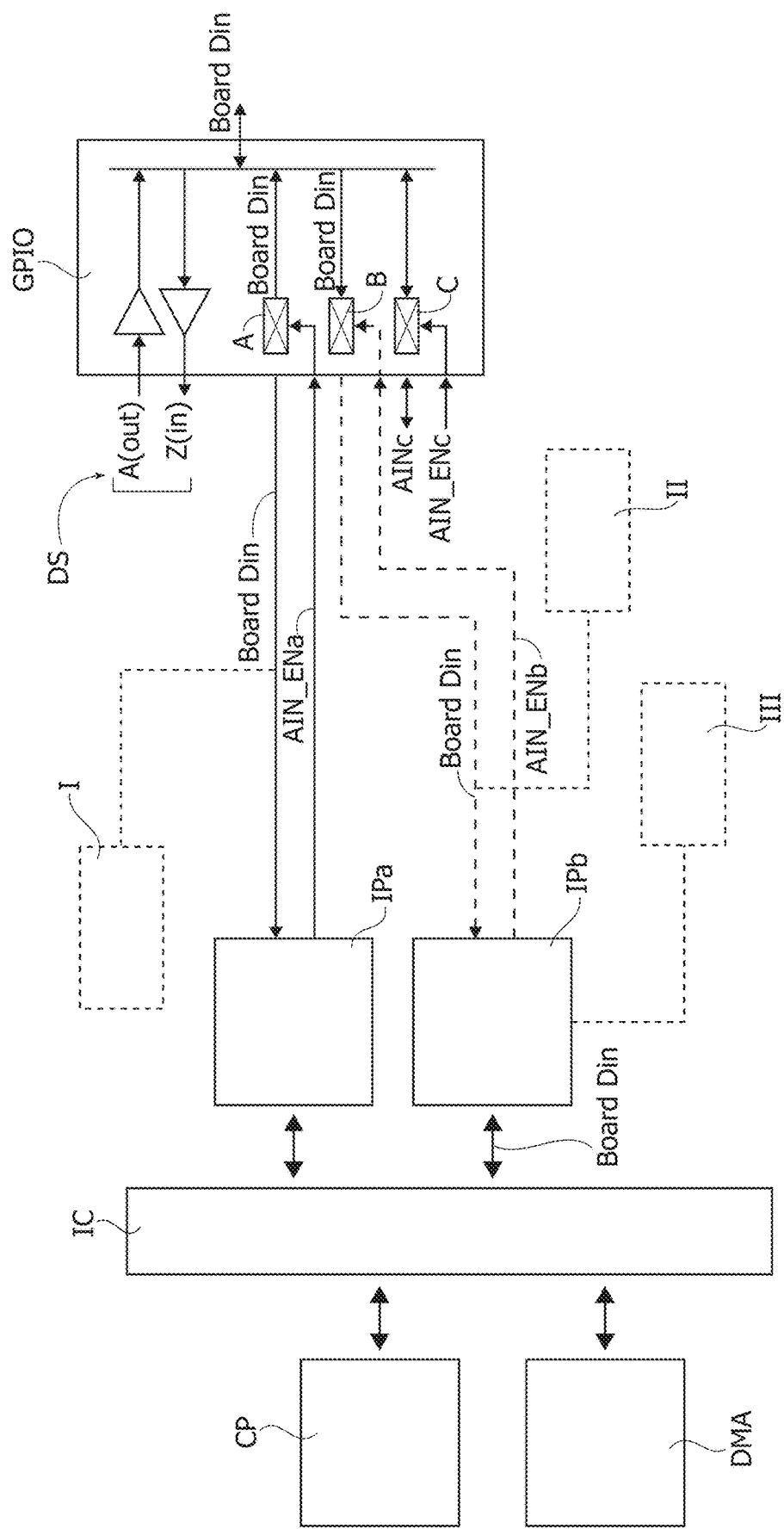
Figure 5:
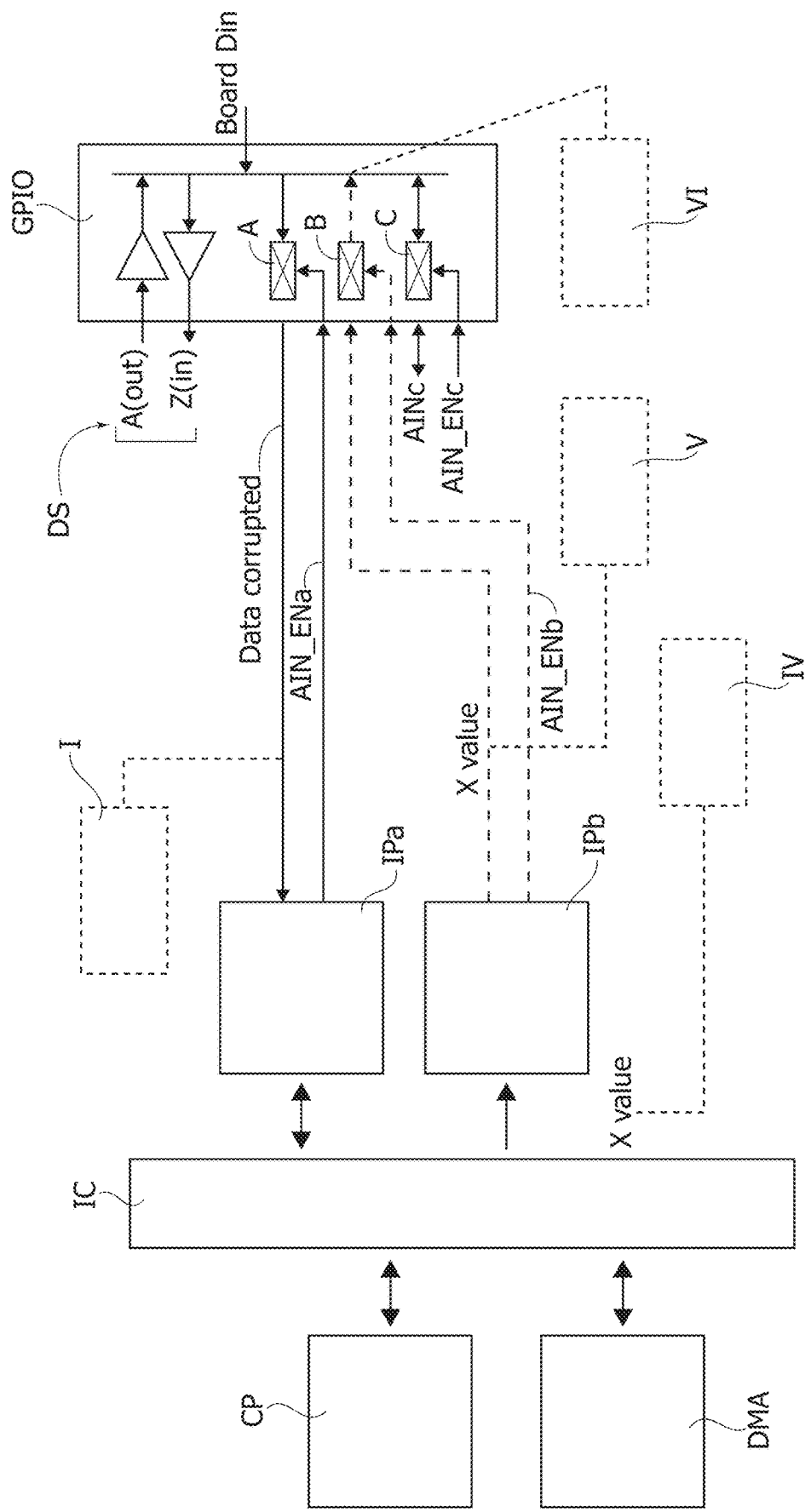

The diagrams of FIGS. 4 and 5 exemplify similar security violations by data eavesdropping or data corruption in the complementary case where a secure analog IP such as e.g. IPa is receiving data from an external board logic (Board Din) through the assigned GPIO. Again, secure connection integrity may be broken by malicious software acting in the same ways discussed above.

It was observed that security issues as exemplified with reference to FIGS. 2 to 5, related to a (single) GPIO feature being shared by plural IP's, may be addressed by dedicating some GPIO's in a SoC to secure analog connections with specific IP's and removing the possibility of pad sharing by equipping such dedicated GPIO's with (only) one analog switch.

This may avoid corruption/eavesdropping risks as discussed previously by having, for instance, only on IP (e.g. IPa) connected to GPIO. It was otherwise observed that such an approach may involve various disadvantages and/or limitations.

A first limit is related to the loss in terms of available GPIO features resulting from dedicating certain GPIO's to secure analog connections. Also, flexibility in mapping secure IP's to GPIO's will be reduced insofar as a certain IP used for secure communications will become unavailable for mapping over a shared GPIO's. System configurability will also be adversely affected since non-secure IP's will be excluded from access to GPIO's dedicated to secure connections. Additionally, SoC resource availability (IP's, GPIO's) with different product packages will be adversely impacted with compatibility issues possibly arising in respect of previous product families having no limitations in IP-GPIO mapping.

Another approach to address possible security issues as discussed in the foregoing may involve configuring all the analog IP's sharing a same GPIO as secure; this may occur e.g. through a security/protection controller block, thus avoiding any mixing of secure/non-secure GPIO's. In that case (e.g. by making IPb in the previous examples as secure as IPa) the risk of security violations will be reduced with the shared GPIO feature maintained.

This will however occur at the expense of reduced flexibility and other types of limitations such as, for example, a negative impact on SoC resource availability to non-secure software, due to IP's sharing GPIO's with a secure IP being configured as secure and thus becoming non-accessible to non-trusted software. Another limitation may, as an example, be reduced flexibility in non-secure IP's mapping over GPIO's due to these being forced to a secure state for the reasons discussed in the foregoing, with an ensuing inability to use their analog connections towards other available, yet non-secure GPIO's. Yet another limitation may, as an example, be a negative impact on user applications since configuration of an IP as secure involves doing the same for other IP's in view of SoC security architecture constraints not mirrored by any functional reasons from a user's viewpoint.

One or more embodiments may apply the general idea of allowing or denying connection of an analog IP with respect to a reachable shared GPIO according to the status of the start and end points of each connection (IP and GPIO) from the view point of system security.

In one or more embodiments, such a "gating" control may be performed by applying a hardware component acting as a secure analog link. By obtaining security information on a certain analog IP and a related GPIO such a component may decide if connection/communication between these two elements is to be allowed (and thus established) or denied (and thus forbidden).

One or more embodiments may provide one or more of the following advantages: the feature of a shared GPIO can be made available without limitations for all the GPIO's and the analog IP's in a system (e.g. SoC); full flexibility in secure mapping of analog IP's onto the GPIO's in e.g. a SoC; full flexibility in non-secure mapping of analog IP's onto the GPIO's in e.g. a SoC; no limitations on resource availability with different package options; no compatibility limitations with respect to previous product families; scalability at SoC level, with applicability to the whole set of analog IP's and GPIO's or just to certain subsets according to application needs; flexible coverage enhancement of conventional security architecture frameworks (ARM TrustZone, for example) due to the extension to analog IP-to-GPIO connections; this may an asset for general-purpose products, like microcontrollers, which may exhibit some difference in terms of ASIC's and special purpose products; independency from specific security solutions and/or providers with ensuing portability across different security architectures; and/or openness to programmability, with changes made possible, even in a dynamic manner, in analog IP-to-GPIO mapping security configuration.

One or more embodiments will now be discussed with reference to FIGS. 6 to 9 wherein like symbols indicate like elements/components/signals as already discussed in connection with FIGS. 1 to 5: consequently, a corresponding detailed description will not be repeated here.

Figure 6:
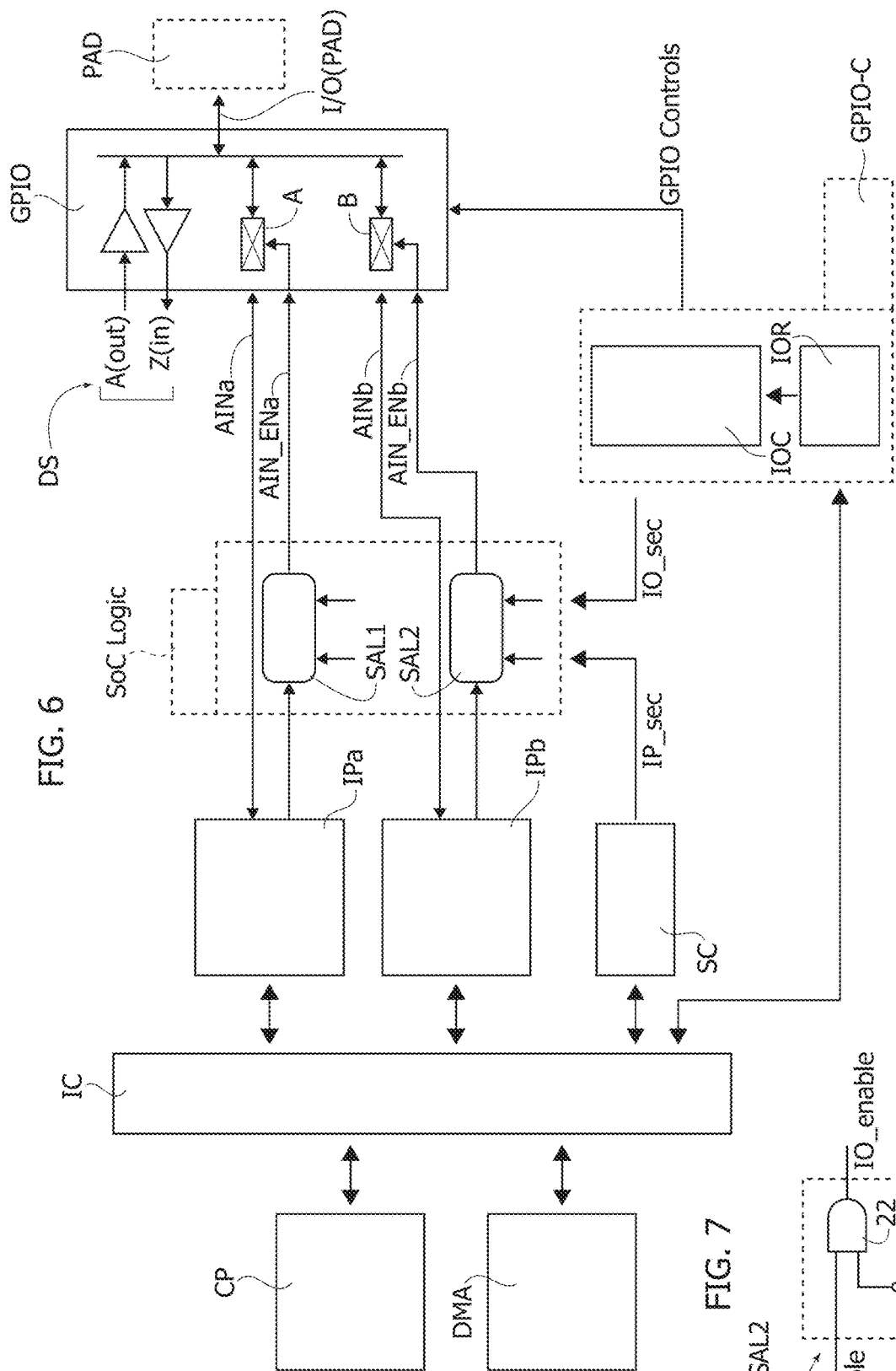
FIG. 6 is a block diagram exemplary of embodiments.

FIG. 6 shows an analog IP-GPIO system (e.g. a SoC sub-system) embedding secure analog link hardware components e.g. SAL1, SAL2, to facilitate security integrity.

The secure analog link components SAL1, SAL2, as exemplified in FIG. 6 are arranged in the enable signal paths of the analog IP's (e.g. IPa, IPb) associated with a shared GPIO to control the propagation of the enable signals towards the associated analog switches A, B, embedded in the GPIO.

The related control action is dependent on the security status of the source and destination of the analog communication channel (analog IP and GPIO).

Such information may be already available with certain functional blocks in the security hardware infrastructure of a conventional SoC. Such information can thus be made available to secure analog link instances such as a security protection controller SC and the GPIO controller(s).

The security controller SC can be configured to define secure/non-secure status of each IP in the system eligible for use by applications running in a secure environment, while the GPIO controllers can provide a secure/non-secure status of each GPIO through their registers. In one or more embodiments, both these instances can be programmed via software.

Based on such information as represented e.g. by binary signals IP_sec (e.g. IP_sec=1→secure; IP_sec=0→non-secure) and IO_sec (IO_sec=1→secure; IO_sec=0→non-secure) each secure analog link circuit SAL1, SAL2, may operate based on the following principle (as already proposed in European Patent Application 17305250.7, cited previously): allowing propagation of the analog switch enable signal from a certain IP to the GPIO, if both the IP and the GPIO are secure; allowing propagation of the analog switch enable signal from a certain IP to the GPIO, if both the IP and the GPIO are non-secure; denying propagation of the analog switch enable signal from the IP to the GPIO if the IP is configured as secure and the GPIO is non-secure; and denying propagation of the analog switch enable signal from the IP to the GPIO if the GPIO is configured as secure and the IP is non-secure.

The secure analog link components SAL1, SAL2 can therefore allow/deny the possibility for analog IP's to control the analog switches A, B in a shared GPIO in order to control sending and receiving data over the associated analog connection.

The functional description of possible operation as provided in the foregoing lends itself to various types of practical implementations, for instance as a function of the application context where the function is implemented (encapsulated).

Figure 7:
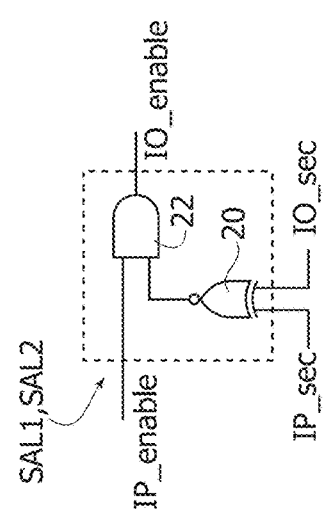
FIG. 7 is exemplary of a secure analog link implementation in one or more embodiments.

FIG. 7 is exemplary of a simple, low-cost implementation (with reduced gate count) of the circuits SAL1, SAL2, including a negated exclusive OR gate (EX-NOR) 20 receiving the signals IP_sec, IO_sec (for the respective link considered) as inputs with the output from the gate 20 fed to one of the inputs of an AND gate 22.

The other input of the AND gate 22 receives the IP_enable signal and provides as an output a signal IO_enable according to the truth table reproduced in the table below:

| IP_sec | IO_sec | IO_enable |
|--------|--------|-----------|
| 1 | 1 | IP_enable |
| 0 | 1 | 0 |
| 1 | 0 | 0 |
| 0 | 0 | IP_enable |

The output signal IO_enable may thus be fed as a respective control signal AIN_ENa, AIN_ENb, . . . to the associated switch A, B, in the GPIO with the ensuing capability of permitting/denying communication between the respective analog IP and the shared GPIO physical link.

The exemplary presentation of the truth table reported in the foregoing is based on the assumption that the analog switches A, B, are controlled (that is, made conductive) by enable signals active high. Alternative possible implementations of the same operational logic can be easily devised by those of skill in the art.

In one or more embodiments, the security components SAL1, SAL2, may be provided only on those connections which may be expected to operate between start and end points with potential different security status during application run.

For instance, if (e.g. for a certain application) all the analog IP's coupled with a same shared GPIO have the same secure/non-secure status, transmission protection by secure analog link components such as SAL1, SAL2, may not be implemented.

This usage flexibility may permit to cover a wide spectrum of applications where security is desirable. This may range from full general-purpose applications, where all possible analog IP-shared-GPIO connections can be equipped with secure analog link components to low-cost or special purpose cases, where (only) specific subsets of analog IP's and GPIO's may be selected to be security aware and thus protected by secure analog link components such as SAL1, SAL2.

Figure 8:
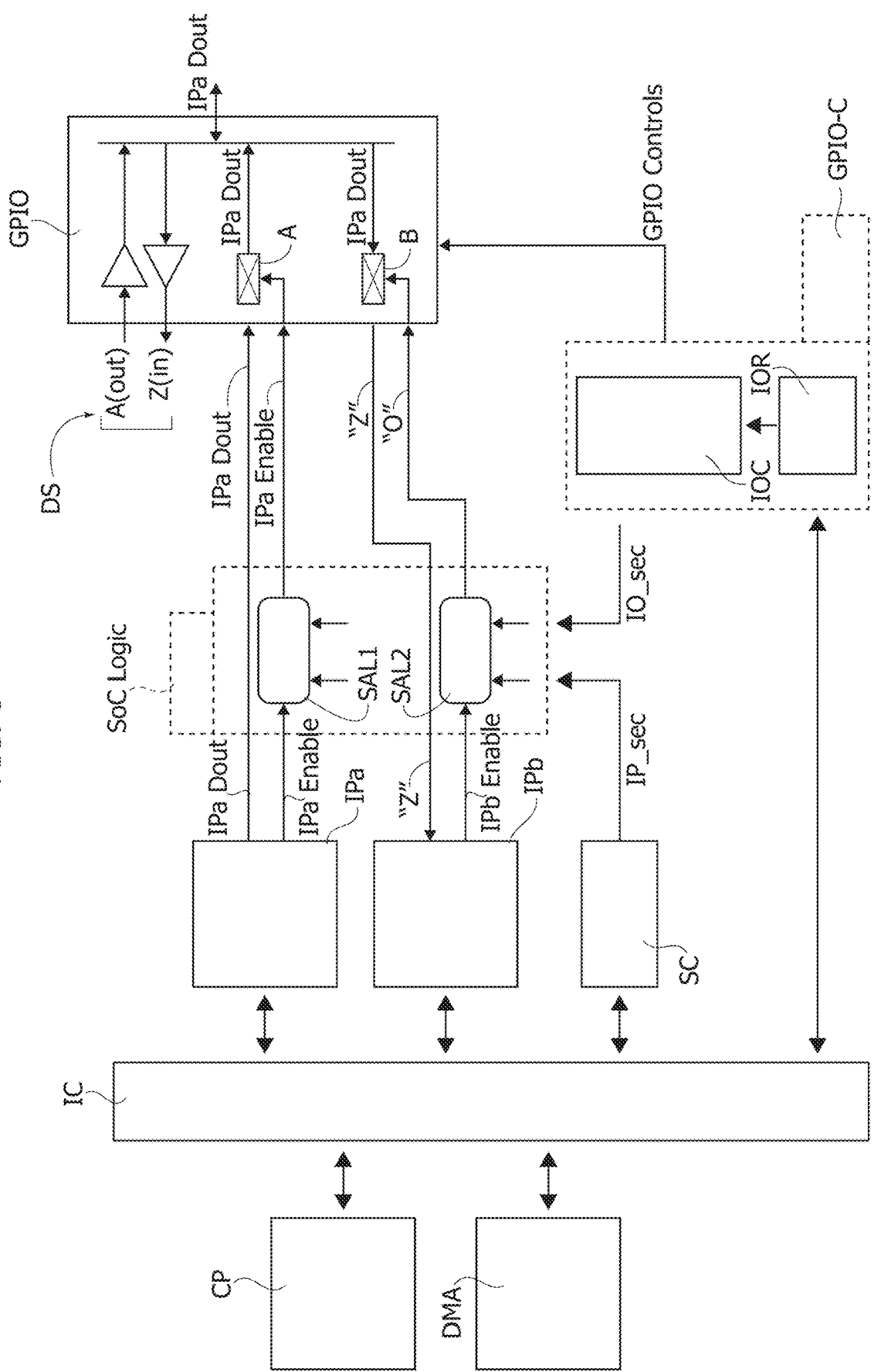

FIGS. 8 and 9 are exemplary of possible operation of an arrangement as exemplified in FIGS. 6 and 7 in providing protection against possible attacks by means of malicious software.

In FIGS. 8 and 9 elements/components/signals like those already discussed in connection with FIGS. 6 and 7 are indicated by like symbols/numerals, thus making it unnecessary to repeat a detailed description.

FIG. 8 is exemplary of how a SoC including secure analog link components such as SAL1, SAL2, can be protected against a possible attack via malicious software trying to eavesdrop analog data transmission over a secure connection.

For the sake of explanation it will be again assumed that IPa is secure, while IPb is non-secure, with the GPIO and related GPIO controller also secure.

According to information on IPa and GPIO security status, as provided by the security controller SC and the GPIO controller, respectively, the associated secure analog link SAL1 will allow communication between the two by copying input enable signals coming from IPa (that is IPa Enable) to the output, thus enabling the connection through the GPIO analog switch A e.g. having recognized both end points (source and destination) of communication as secure.

At the same time, the secure analog link component SAL2 located on the other connection between IPb and the GPIO (made available due to the GPIO feature being shared) may perform the same check and deny (that is, block) propagation of the IPb Enable signal towards the associated analog switch B, e.g. by driving its enable terminal to "0", having recognized IPb as non-secure.

In that way, the IPa data output (IPa Dout), shared in the GPIO shall not propagate to IPb (non-secure) because the associated analog switch B will not close the connection so that secure data cannot be eavesdropped by malicious software acting on IPb.

FIG. 9 is exemplary of how a system (e.g. a SoC) equipped with a secure analog link component as exemplified herein may be protected against possible attacks via malicious software trying to corrupt analog data transmission over a secure connection.

In the exemplary case of FIG. 9, the secure analog link component SAL1 arranged on the connection between IPa and shared GPIO will permit propagation of the IPa enable signal in view of the secure status of both end points of communication.

On the other hand, the secure analog link component SAL 2 arranged between IPb (non-secure) and the shared GPIO will block the propagation of the IPb enable signal towards the associated analog switch B, due to the IPb non-secure status, thus avoiding propagation towards the shared GPIO of corrupting data (X_value) possibly injected by malicious software through the digital interface of IPb. In that way, X-value will be prevented from corrupting secure analog communication between IPa and the shared pad, letting IPa Dout reach the external board logic.

The examples of FIGS. 8 and 9 refer to secure analog communication from an IP to a shared GPIO (transmission mode, TX).

It will be appreciated that the same criteria just discussed can be applied for secure analog communication in the opposite direction, namely from a shared GPIO to an IP (receiver mode, RX) via the secure analog link components SAL1, SAL2, arranged on the analog switch enable paths (switches A, B).

It will be similarly appreciated that the embodiments are not limited to application in the context of security applications e.g. for multi-purpose microprocessor-based consumer applications such as home appliances and the like.

For instance, one or more embodiments may be applied to situations where a separation of analog hardware resources may be desirable. This may be the case, for example, of SoC hardware/software partitions in certain areas such as the automotive sector.

In these cases, the same components used for implementing one or more embodiments as exemplified herein will receive, through software programming or via hardware, configuration information on IP's and shared GPIO's including information on the partitions to which they belong. This will permit to allow or deny analog communication between IP's and GPIO's as discussed previously.

One or more embodiments may thus provide a system, including a plurality of (analog) intellectual property circuits (e.g. IPa, IPb) and a general purpose input/output circuit (e.g. GPIO) shared by the plurality of intellectual property circuits via respective analog links (e.g. AINa, AINb). The system may further include a plurality of analog switches (e.g. A, B) respectively coupled with the analog links. The analog switches may be configured to control signal propagation over the respective analog links, and may be activatable via switch enable signals (e.g. AIN_ENa, AIN_ENb) over respective switch enable paths. Each switch enable path may have a first end coupled to a respective one of the intellectual property circuits and a second end coupled to the shared general purpose input/output circuit. At least one switch enable path includes a secure analog link circuit (e.g. SAL1, SAL2) sensitive to a secure/non-secure status (e.g. IP_sec, IO_sec) of the intellectual property circuit and the general purpose input/output circuit coupled to the first and the second ends of the at least one switch enable path. The secure analog link circuit may be configured (e.g. 20, 22) to admit propagation of a switch enable signal as a result of the intellectual property circuit and the general purpose input/output circuit coupled to the first end and the second end of the at least one switch enable path having both secure status or both non-secure status.

In one or more embodiments, the analog switches may be arranged at the second end of the switch enable paths.

In one or more embodiments the secure analog link circuit may include a first logic gate (e.g. 20) having inputs (e.g. IP_sec, IO_sec) coupled to the first end and the second end of the at least one switch enable path and an output having a first logic value and a second logic value as a function of said inputs having a same logic value and different logic values, respectively. The secure analog link circuit may further include a second logic gate (e.g. 22) coupled to the output of the first logic gate. The second logic gate may be switchable between a first state and a second state allowing and denying, respectively, propagation of switch enable signals through the secure analog link circuit. The second logic gate may have said first state and said second state as a function of the output of the first logic gate being at said first logic value and at said second logic value, respectively.

In one or more embodiments, the first logic gate and the second logic gate may include an EX-NOR gate and an AND gate, respectively.

One or more embodiments may include an intellectual property security controller (e.g. SC) and a GPIO controller (e.g. GPIO-C) configured for providing to the secure analog link circuit security status signals indicative of the secure/non-secure status of the intellectual property circuit and the general purpose input/output circuit coupled to the first end and the second end of the at least one of the switch enable paths.

In one or more embodiments system may include a System-on-Chip or a subsystem thereof.

In one or more embodiments apparatus (e.g. a microcontroller-based appliance) may include a processor circuit (e.g. CP) interfacing with an input/output pad by means of a system according to one or more embodiments.

A method of operation of a system according to one or more embodiments may include providing to the secure analog link circuit security status signals indicative of the secure/non-secure status of the intellectual property circuit and the general purpose input/output circuit coupled to the first end and the second end of the at least one of the switch enable paths. The method may further include admitting, by the secure analog link circuit, propagation of a switch enable signal therealong as a result of the intellectual property circuit and the general purpose input/output circuit coupled to the first end and the second end of the at least one of the switch enable paths having both secure status or both non-secure status.

One or more embodiments avoid that data communication between a secure analog IP and a secure GPIO, on a selected IP-GPIO connection, may be eavesdropped or snooped by malicious software by exploiting another, non-secure, analog connection to the same GPIO sharing a same I/O pad.

One or more embodiments avoid that data communication between a secure analog IP and a secure GPIO, on a selected IP-GPIO connection, may be undesirably corrupted by malicious software by forcing data through another, non-secure, analog connection to the same GPIO, sharing a same I/O pad.

Without prejudice to the underlying principles, the details and embodiments may vary, even significantly, with respect to what has been described, by way of example only, without departing from the extent of protection.

What is claimed is:

1. A system, comprising:
   an intellectual property circuit;
   a general purpose input/output circuit coupled to the intellectual property circuit via a data path;
   a switch coupled to the data path, the switch controlling signal propagation between the intellectual property circuit and the general purpose input/output circuit on the data path, the switch activatable via a switch enable signal propagated on a switch enable path, the switch enable path having a first end coupled to the intellectual property circuit and a second end coupled to the switch; and
   a secure link circuit coupled between the intellectual property circuit and the switch along the switch enable path, the secure link circuit being sensitive to a security status of the intellectual property circuit and a security status of the general purpose input/output circuit, the secure link circuit being configured to admit propagation of the switch enable signal on the switch enable path in response to the intellectual property circuit and the general purpose input/output circuit having identical security statuses.

2. The system of claim 1, wherein the security status of the general purpose input/output circuit and the security status of the intellectual property circuit comprise a secure status or a non-secure status.

3. The system of claim 2, wherein the secure link circuit is configured to admit propagation of the switch enable signal on the switch enable path in response to the intellectual property circuit having the secure status and the general purpose input/output circuit having the secure status or in response to the intellectual property circuit having the non-secure status and the general purpose input/output circuit having the non-secure status.

4. The system of claim 1, wherein the secure link circuit is configured to block propagation of the switch enable signal on the switch enable path in response to the intellectual property circuit and the general purpose input/output circuit having different security statuses.

5. The system of claim 1, wherein the secure link circuit comprises:

a first logic gate having inputs configured to receive signals indicative of the security statuses of the intellectual property circuit and the general purpose input/output circuit, wherein an output of the first logic gate has a first logic value and a second logic value as a function of the inputs having a same logic value and different logic values, respectively; and a second logic gate having a first input coupled to the output of the first logic gate, a second input coupled to the first end of the switch enable path, and an output of the second logic gate coupled to the second end of the switch enable path, the second logic gate switchable between a first state and a second state allowing and denying, respectively, propagation of the switch enable signal on the switch enable path through the secure link circuit, the second logic gate having the first state and the second state as a function of the output of the first logic gate being at the first logic value and at the second logic value, respectively.

6. The system of claim 5, wherein the first logic gate and the second logic gate comprise an EX-NOR gate and an AND gate, respectively.

7. The system of claim 1, further comprising:

an intellectual property security controller configured to provide to the secure link circuit a first security status signal indicative of the security status of the intellectual property circuit; and a general purpose input/output controller configured to provide to the secure link circuit a second security status signal indicative of the security status of the general purpose input/output circuit.

8. The system of claim 1, further comprising a system-on-chip or a subsystem thereof communicatively coupled to the intellectual property circuit via an interconnect channel.

9. The system of claim 1, wherein the switch comprises an analog switch embedded in the general purpose input/output circuit.

10. The system of claim 1, wherein the secure link circuit comprises a logic gate having a first input to receive a first security status signal indicative of the security status of the intellectual property circuit and a second input to receive a second security status signal indicative of the security status of the general purpose input/output circuit, and an output of the logic gate has a first logic value when the first security status signal and the second security status signal are the same and a second logic value different from the first logic value when the first security status signal and the second security status signal are different.

11. An apparatus, comprising:
a processor circuit;
a system communicatively coupled to the processor circuit, the system comprising:
an intellectual property circuit;
a general purpose input/output circuit coupled to the intellectual property circuit via a data path;
a switch coupled to the data path, the switch controlling signal propagation between the intellectual property circuit and the general purpose input/output circuit on the data path, the switch activatable via a switch enable signal propagated on a switch enable path, the switch enable path having a first end coupled to the intellectual property circuit and a second end coupled to the switch; and
a secure link circuit coupled between the intellectual property circuit and the switch along the switch enable path, the secure link circuit being sensitive to a security status of the intellectual property circuit and a security status of the general purpose input/output circuit, the secure link circuit being configured to admit propagation of the switch enable signal on the switch enable path in response to the intellectual property circuit and the general purpose input/output circuit having identical security statuses; and
an input/output pad coupled to the general purpose input/output circuit, wherein the processor circuit is configured to communicate with the input/output pad via the system.

12. The apparatus of claim 11, wherein the security status of the general purpose input/output circuit and the security status of the intellectual property circuit comprise a secure status or a non-secure status.

13. The apparatus of claim 12, wherein the secure link circuit is configured to admit propagation of the switch enable signal on the switch enable path in response to the intellectual property circuit having the secure status and the general purpose input/output circuit having the secure status or in response to the intellectual property circuit having the non-secure status and the general purpose input/output circuit having the non-secure status.

14. The apparatus of claim 11, wherein the secure link circuit is configured to block propagation of the switch enable signal on the switch enable path in response to the intellectual property circuit and the general purpose input/output circuit having different security statuses.

15. The apparatus of claim 11, wherein the secure link circuit comprises:

a first logic gate having inputs configured to receive signals indicative of the security statuses of the intellectual property circuit and the general purpose input/output circuit, wherein an output of the first logic gate has a first logic value and a second logic value as a function of the inputs having a same logic value and different logic values, respectively; and a second logic gate having a first input coupled to the output of the first logic gate, a second input coupled to the first end of the switch enable path, and an output of the second logic gate coupled to the second end of the switch enable path, the second logic gate switchable between a first state and a second state allowing and denying, respectively, propagation of the switch enable signal on the switch enable path through the secure link circuit, the second logic gate having the first state and the second state as a function of the output of the first logic gate being at the first logic value and at the second logic value, respectively.

16. The apparatus of claim 15, wherein the first logic gate and the second logic gate comprise an EX-NOR gate and an AND gate, respectively.

17. The apparatus of claim 11, wherein the switch comprises an analog switch embedded in the general purpose input/output circuit.

18. The apparatus of claim 11, wherein the secure link circuit comprises a first logic gate having a first input to receive a first security status signal indicative of the security status of the intellectual property circuit and a second input to receive a second security status signal indicative of the security status of the general purpose input/output circuit, and an output of the first logic gate has a first logic value when the first security status signal and the second security status signal are the same and a second logic value different from the first logic value when the first security status signal and the second security status signal are different.

19. A method, comprising:
generating, by an intellectual property security controller, a first security status signal indicative of a security status of an intellectual property circuit;
generating, by a general purpose input/output controller, a second security status signal indicative of a security status of a general purpose input/output circuit coupled to the intellectual property circuit via a data path;
providing, by the intellectual property security controller and the general purpose input/output controller to a secure link circuit, the first security status signal and the second security status signal, the secure link circuit being coupled between the intellectual property circuit and a switch along a switch enable path having a first end coupled to the intellectual property circuit and a second end coupled to the switch; and
admitting, by the secure link circuit, propagation of a switch enable signal along the switch enable path when the first security status signal and the second security status signal are identical.

20. The method of claim 19, further comprising activating a switch coupled to the data path using the switch enable signal, wherein the switch is configured to control signal propagation on the data path.

21. The method of claim 19, further comprising blocking, by the secure link circuit, propagation of the switch enable signal on the switch enable path in response to the intellectual property circuit and the general purpose input/output circuit having different security statuses.

22. The method of claim 19, wherein the security status of the general purpose input/output circuit and the security status of the intellectual property circuit comprise a secure status or a non-secure status.

23. A system, comprising:
a secure intellectual property circuit;
a non-secure intellectual property circuit;
a general purpose input/output circuit coupled to the secure intellectual property circuit via a first data path and coupled to the non-secure intellectual property circuit via a second data path;
a first switch coupled to the first data path, the first switch controlling signal propagation between the secure intellectual property circuit and the general purpose input/output circuit on the first data path, the first switch activatable via a first switch enable signal propagated on a first switch enable path, the first switch enable path having a first end coupled to the secure intellectual property circuit and a second end coupled to the first switch; and
a first secure logic circuit coupled between the secure intellectual property circuit and the first switch along the first switch enable path, the first secure logic circuit being sensitive to a security status of the secure intellectual property circuit and a security status of the general purpose input/output circuit, the first secure logic circuit being configured to
admit propagation of the first switch enable signal on the first switch enable path when the secure intellectual property circuit and the general purpose input/output circuit have identical security statuses, and
deny propagation of the first switch enable signal on the first switch enable path when the secure intellectual property circuit and the general purpose input/output circuit have different security statuses.

24. The system of claim 23, wherein the first secure logic circuit comprises a first logic gate having a first input to receive a first security status signal indicative of the security status of the secure intellectual property circuit and a second input to receive a second security status signal indicative of the security status of the general purpose input/output circuit, and an output of the first logic gate has a first logic value when the first security status signal and the second security status signal are the same and a second logic value different from the first logic value when the first security status signal and the second security status signal are different.

25. The system of claim 24, wherein the first secure logic circuit comprises a second logic gate having a first input of the second logic gate coupled to the output of the first logic gate, a second input of the second logic gate coupled to the first end of the first switch enable path, and an output of the second logic gate coupled to the second end of the first switch enable path, the second logic gate switchable between a first state and a second state allowing and denying, respectively, propagation of the first switch enable signal on the first switch enable path through the first secure logic circuit, the second logic gate having the first state and the second state as a function of the output of the first logic gate being at the first logic value and at the second logic value, respectively.

26. The system of claim 25, wherein the first logic gate and the second logic gate comprise an EX-NOR gate and an AND gate, respectively.

27. The system of claim 23, further comprising:
a second switch coupled to the second data path, the second switch controlling signal propagation between the non-secure intellectual property circuit and the general purpose input/output circuit on the second data path, the second switch activatable via a second switch enable signal propagated on a second switch enable path, the second switch enable path having a first end coupled to the non-secure intellectual property circuit and a second end coupled to the second switch; and
a second secure logic circuit coupled between the non-secure intellectual property circuit and the second switch along the second switch enable path, the second secure logic circuit being sensitive to a security status of the non-secure intellectual property circuit and the security status of the general purpose input/output circuit, the second secure logic circuit being configured to
admit propagation of the second switch enable signal on the second switch enable path when the non-secure intellectual property circuit and the general purpose input/output circuit have identical security statuses, and
deny propagation of the second switch enable signal on the second switch enable path when the non-secure intellectual property circuit and the general purpose input/output circuit have different security statuses.

* * * * *

UNITED STATES PATENT AND TRADEMARK OFFICE
CERTIFICATE OF CORRECTION

PATENT NO. : 10,891,399 B2  
APPLICATION NO. : 15/945177  
DATED : January 12, 2021  
INVENTOR(S) : Mirko Dondini et al.

Page 1 of 1

It is certified that error appears in the above-identified patent and that said Letters Patent is hereby corrected as shown below:

On the Title Page

Item (73) Assignee, Lines 1-2, delete "Agrafe Brianza (IT)" and insert --Agrate Brianza (IT)--.

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*